US011823353B2

(12) United States Patent
Luo et al.

(10) Patent No.: US 11,823,353 B2
(45) Date of Patent: Nov. 21, 2023

(54) SYSTEM AND METHOD FOR GENERATING BOKEH IMAGE FOR DSLR QUALITY DEPTH-OF-FIELD RENDERING AND REFINEMENT AND TRAINING METHOD FOR THE SAME

(71) Applicant: Samsung Electronics Co., Ltd., Suwon-si (KR)

(72) Inventors: Chenchi Luo, Plano, TX (US); Yingmao Li, Allen, TX (US); Kaimo Lin, Allen, TX (US); Youngjun Yoo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 17/106,676

(22) Filed: Nov. 30, 2020

(65) Prior Publication Data
US 2022/0036513 A1    Feb. 3, 2022

Related U.S. Application Data

(60) Provisional application No. 63/057,470, filed on Jul. 28, 2020.

(51) Int. Cl.
*G06T 5/00* (2006.01)
*G06T 7/593* (2017.01)
(Continued)

(52) U.S. Cl.
CPC ............. *G06T 5/002* (2013.01); *G06N 3/08* (2013.01); *G06T 5/50* (2013.01); *G06T 7/593* (2017.01);
(Continued)

(58) Field of Classification Search
None
See application file for complete search history.

(56) References Cited

U.S. PATENT DOCUMENTS 7,912,319 B2    3/2011    Lakshamanan et al.
8,189,100 B2    5/2012    Li et al.
(Continued)

FOREIGN PATENT DOCUMENTS

CN    107680053 A  *  2/2018  ........... G06K 9/6256
CN    109191469 A  *  1/2019  ............. G06N 3/061
(Continued)

OTHER PUBLICATIONS

A. Ignatov et al., "AIM 2019 Challenge on Bokeh Effect Synthesis: Methods and Results," 2019 IEEE/CVF International Conference on Computer Vision Workshop (ICCVW), 2019, pp. 3591-3598, doi: 10.1109/ICCVW.2019.00444.*
(Continued)

*Primary Examiner* — Jiangeng Sun (57) ABSTRACT

A method includes processing, using at least one processor of an electronic device, multiple reference images of a scene using a first convolutional neural network (CNN) to generate a confidence map and a disparity map. The method also includes generating, using the at least one processor, an initial Bokeh image based on the disparity map and the reference images using a depth-of-field (DoF) renderer. The method further includes refining, using the at least one processor, the initial Bokeh image using a second CNN to generate a refined Bokeh image, where the second CNN uses the confidence map, the disparity map, and the reference images to generate the refined Bokeh image.

20 Claims, 9 Drawing Sheets

(51) Int. Cl.
*G06T 5/50* (2006.01)
*G06N 3/08* (2023.01)

(52) U.S. Cl.
CPC .............. *G06T 2207/10012* (2013.01); *G06T 2207/20081* (2013.01); *G06T 2207/20084* (2013.01)

(56) References Cited

U.S. PATENT DOCUMENTS

| | | | |
|---|---|---|---|
| 9,442,363 B2 | 9/2016 | Seo et al. | |
| 9,621,786 B2 | 4/2017 | Takahashi | |
| 9,906,721 B2 | 2/2018 | Evans, V et al. | |
| 10,311,337 B1 | 6/2019 | Kim et al. | |
| 10,373,073 B2 | 8/2019 | Kisilev | |
| 2015/0003752 A1 | 1/2015 | Venkataraman et al. | |
| 2015/0085083 A1 | 3/2015 | Chen et al. | |
| 2015/0170400 A1 | 6/2015 | Seitz et al. | |
| 2016/0063719 A1* | 3/2016 | Ukil | G06T 7/557 382/103 |
| 2017/0127039 A1* | 5/2017 | Liu | H04N 13/128 |
| 2017/0366749 A1 | 12/2017 | Zolotov | |
| 2018/0139382 A1 | 5/2018 | Venkataraman et al. | |
| 2019/0073749 A1 | 3/2019 | Lin et al. | |
| 2019/0080457 A1* | 3/2019 | Shukla | G06V 40/10 |
| 2019/0208181 A1* | 7/2019 | Rowell | H04N 9/8227 |
| 2019/0244380 A1* | 8/2019 | Op Het Veld | G06V 10/751 |
| 2019/0362514 A1* | 11/2019 | Sinha | G06V 10/758 |
| 2020/0042833 A1 | 2/2020 | Toor et al. | |
| 2020/0294260 A1* | 9/2020 | Kashiwagi | G06T 7/571 |
| 2020/0322544 A1* | 10/2020 | Jung | H04N 23/959 |
| 2021/0073953 A1* | 3/2021 | Lee | G06T 7/571 |
| 2021/0319537 A1* | 10/2021 | Hiasa | G06N 3/084 |
| 2022/0114703 A1* | 4/2022 | Kang | H04N 5/2621 |

FOREIGN PATENT DOCUMENTS

| | | | |
|---|---|---|---|
| CN | 113076685 A | * | 7/2021 |
| KR | 10-2020-0020646 A | | 2/2020 |
| WO | 2009142332 A1 | | 11/2009 |

OTHER PUBLICATIONS

L. Du, J. Li, X. Ye and X. Zhang, "Weakly Supervised Deep Depth Prediction Leveraging Ground Control Points for Guidance," in IEEE Access, vol. 7, pp. 5736-5748, 2019, doi: 10.1109/ACCESS.2018.2885773.*

K. Purohit, M. Suin, P. Kandula and R. Ambasamudram, "Depth-Guided Dense Dynamic Filtering Network for Bokeh Effect Rendering," 2019 IEEE/CVF International Conference on Computer Vision Workshop (ICCVW), 2019, pp. 3417-3426, doi: 10.1109/ICCVW.2019.00424.*

S. Choi, S. Kim, K. park and K. Sohn, "Learning Descriptor, Confidence, and Depth Estimation in Multi-view Stereo," 2018 IEEE/CVF Conference on Computer Vision and Pattern Recognition Workshops (CVPRW), 2018, pp. 389-3896, doi: 10.1109/CVPRW.2018.00065.*

International Search Report and Written Opinion of the International Searching Authority dated Oct. 27, 2021 in connection with International Patent Application No. PCT/KR2021/009642, 9 pages.

Kumar et al., "Feature Map Augmentation to Improve Rotation Invariance in Convolutional Neural Networks," Springer Nature Switzerland AG, 2020, pp. 348-359.

Li et al., "Apparatus and Method for Dynamic Multi-Camera Rectification Using Depth Camera," U.S. Appl. No. 16/703,712, filed Dec. 4, 2019, 50 pages.

Luo et al., "Mobile Data Augmentation Engine for Personalized On-Device Deep Learning System," U.S. Appl. No. 16/946,989, filed Jul. 14, 2020, 39 pages.

* cited by examiner

SYSTEM AND METHOD FOR GENERATING BOKEH IMAGE FOR DSLR QUALITY DEPTH-OF-FIELD RENDERING AND REFINEMENT AND TRAINING METHOD FOR THE SAME

CROSS-REFERENCE TO RELATED APPLICATION AND PRIORITY CLAIM

This application claims priority under 35 U.S.C. § 119(e) to U.S. Provisional Patent Application No. 63/057,470 filed on Jul. 28, 2020, which is hereby incorporated by reference in its entirety.

TECHNICAL FIELD

This disclosure relates generally to imaging systems. More specifically, this disclosure relates to a system and method for generating a Bokeh image for digital single-lens reflex (DSLR) quality depth-of-field rendering and refinement and a training method for the same.

BACKGROUND

Many mobile electronic devices, such as smartphones and tablet computers, include cameras that can be used to capture still and video images. While convenient, cameras on mobile electronic devices typically have short focal lengths and small aperture sizes, so pictures taken on a mobile electronic device are usually sharp. "Bokeh" refers to an effect that helps to improve the aesthetic quality of an image by blurring out-of-focus portions of the image (such as a background of the image) while keeping other portions of the image (such as a foreground or one or more subjects) in focus. For many mobile electronic devices, Bokeh is achieved computationally rather than optically. For example, a mobile electronic device may estimate various depths in a scene, and Bokeh images of the scene can be created computationally using the estimated depths.

SUMMARY

This disclosure provides a system and method for generating a Bokeh image for DSLR quality depth-of-field rendering and refinement and a training method for the same.

In a first embodiment, a method includes processing, using at least one processor of an electronic device, multiple reference images of a scene using a first convolutional neural network (CNN) to generate a confidence map and a disparity map. The method also includes generating, using the at least one processor, an initial Bokeh image based on the disparity map and the reference images using a depth-of-field (DoF) renderer. The method further includes refining, using the at least one processor, the initial Bokeh image using a second CNN to generate a refined Bokeh image, where the second CNN uses the confidence map, the disparity map, and the reference images to generate the refined Bokeh image.

In a second embodiment, an electronic device includes at least one memory configured to store multiple reference images of a scene. The electronic device also includes at least one processing device configured to process the reference images using a first CNN to generate a confidence map and a disparity map. The at least one processing device is also configured to generate an initial Bokeh image based on the disparity map and the reference images using a DoF renderer. The at least one processing device is further configured to refine the initial Bokeh image using a second CNN to generate a refined Bokeh image, where the second CNN is configured to use the confidence map, the disparity map, and the reference images to generate the refined Bokeh image.

In a third embodiment, a method includes obtaining, using at least one processor of an electronic device, training data that includes multiple reference images, a ground truth disparity map, and a ground truth Bokeh image. The method also includes training, using the at least one processor, a CNN using the reference images and the ground truth disparity map. The method further includes training, using the at least one processor, a second CNN using the reference images, an initial Bokeh image, a confidence map generated during the training of the first CNN, and a predicted disparity map generated during the training of the first CNN.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first"

and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 9, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, Bokeh" refers to an effect that helps to improve the aesthetic quality of an image by blurring out-of-focus portions of the image (such as a background of the image) while keeping other portions of the image (such as a foreground or one or more subjects) in focus. Due to lens and sensor size limitations, many devices can only simulate the Bokeh effect using stereo depth estimation and depth-of-field (DoF) rendering. In a typical computational Bokeh pipeline in a smart phone or other device, the stereo depth estimation and DoF renderer are two separate modules that operate sequentially and independently from one another. For example, in depth estimation, a typical process involves down-sampling a stereo image pair, applying a disparity estimation algorithm to generate a disparity map, and up-sampling the disparity map and converting it to a depth map.

The DoF renderer takes the depth map (or the disparity map) and a simulated lens configuration (such as focal length, aperture, and the like) and blurs portions of an image to different degrees based on their distances from a selected focal plane. Given the simulated lens configuration, the behavior of the DoF renderer is precisely defined, namely it applies different degrees of blurriness to a scene according to the depth map. However, since the two modules are sequential, the DoF renderer cannot recover the errors in the depth estimation module. Also, a conventional DoF renderer does not include any machine learning operations or techniques. As a result, errors in the depth estimation typically result in one or more artifacts in rendered Bokeh images. In other words, the quality of a Bokeh image largely depends on the depth map instead of the DoF renderer.

This disclosure provides systems and methods for generating refined Bokeh images. The disclosed embodiments implement a Bokeh network architecture that includes one or more machine learning techniques to refine Bokeh images. In the disclosed embodiments, the generation of a refined Bokeh image is separated into two steps. One step is performed at the time of image capture, where a modified disparity network is applied to generate a disparity map and a confidence map. The DoF renderer generates a Bokeh image based on reference images and the disparity map. The resulting Bokeh image can be shown in a live view to a user. Another step is performed in an image gallery mode or gallery application on a device, where a DoF network is applied to refine the Bokeh image based on meta information obtained at capture time. Compared with conventional Bokeh image generation techniques that rely on imperfect depth maps, the disclosed embodiments ensure both a good user experience (where the user can view the Bokeh image immediately) and good image quality (where the Bokeh image is refined by fusing multiple sources of meta information).

Figure 1:
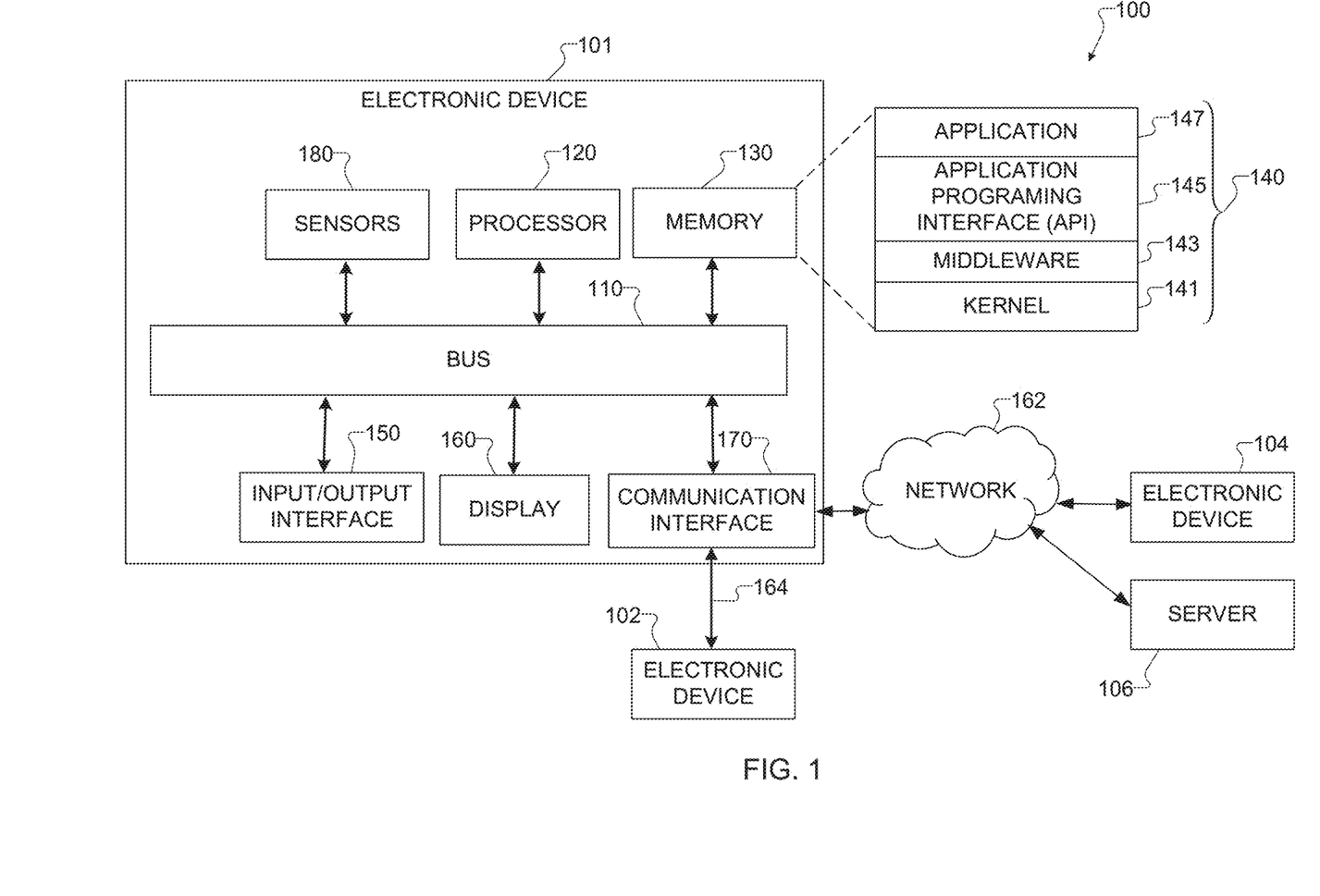
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 can process multiple reference images using a first convolutional neural network (CNN) to generate a confidence map and a disparity map, generate an initial Bokeh image based on the disparity map and the reference images using a DoF renderer, and refine the initial Bokeh image using a second CNN to generate a refined Bokeh image (where the second CNN uses the confidence map, the disparity map, and the reference images to generate the refined Bokeh image).

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 can process multiple reference images using a first CNN to generate a confidence map and a disparity map, generate an initial Bokeh image based on the disparity map and the reference images using a DoF renderer, and refine the initial Bokeh image using a second CNN to generate a refined Bokeh image (where the second CNN uses the confidence map, the disparity map, and the reference images to generate the refined Bokeh image).

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
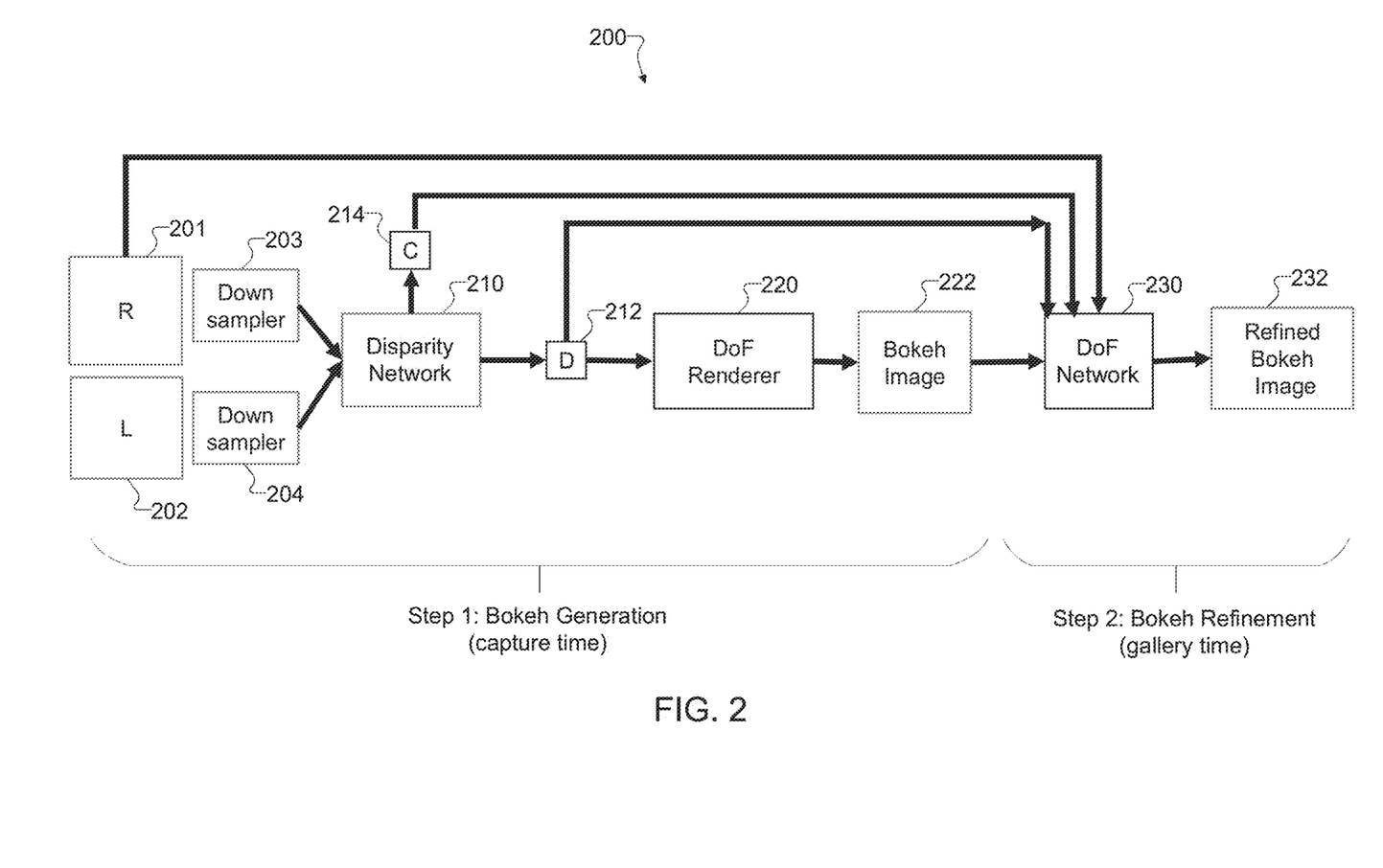
FIG. 2 illustrates an example architecture for a Bokeh network for generating and refining a Bokeh image according to this disclosure.

FIG. 2 illustrates an example architecture for a Bokeh network 200 for generating and refining a Bokeh image according to this disclosure. For ease of explanation, the Bokeh network 200 is described as being implemented in the electronic device 101 shown in FIG. 1. However, the Bokeh network 200 could be implemented in any other suitable electronic device and in any suitable system, such as by the server 106. As described below, the Bokeh network 200 uses one or more machine learning techniques to generate a Bokeh image at capture time and refine the Bokeh image in an image gallery mode or gallery application.

As shown in FIG. 2, the Bokeh network 200 includes a disparity network 210, a DoF renderer 220, and a DoF network 230. Operation of the Bokeh network 200 is divided into two steps. The first step is a Bokeh image generation step that is performed at capture time. The second step is a Bokeh refinement step that is performed in a gallery mode or gallery application of the electronic device 101. The two-step Bokeh network 200 can be implemented for both still image capture and video capture.

During the first step, the electronic device 101 receives or obtains two images 201 and 202 of a scene that together form a stereo image pair. In some embodiments, the electronic device 101 captures the images 201 and 202 in response to an event, such as a user actuating a shutter control. In particular embodiments, the electronic device 101 includes multiple RGB cameras or other imaging sensors 180, and the imaging sensors 180 capture the images 201 and 202 at approximately the same moment. For example, a first imaging sensor 180 could capture the image 201, and a second imaging sensor 180 could capture the image 202. In particular embodiments, the images 201 and 202 are RGB images or other images that generally capture the same scene, but the images 201 and 202 appear to be from different distances or slightly different angles. For instance, the image 201 could be taken from an angle such that the image 201 appears to be a right image, and the image 202 could be taken from a different angle such that the image 202 appears to be a left image.

The electronic device 101 downsamples each of the images 201 and 202 using downsampler operations 203 and 204. For example, the electronic device 101 downsamples the image 201 using the downsampler operation 203 and downsamples the image 202 using the downsampler operation 204. The downsampler operations 203 and 204 are performed to reduce the quantity of data to be input to the disparity network 210. The downsampler operations 203 and 204 can include any suitable downsampling or compression algorithms. While shown as two separate operations or algorithms, the downsampler operations 203 and 204 could include the same operation or algorithm that is performed serially for the images 201 and 202. Once the electronic device 101 downsamples the images 201 and 202, the downsampled images 201 and 202 are provided as inputs to the disparity network 210.

The electronic device 101 applies the disparity network 210 to the downsampled images 201 and 202 in order to produce a disparity map 212 and a confidence map 214. The disparity map 212 represents a disparity map that corresponds to the images 201 and 202, where different values represent different depths in the images 201 and 202. Depending on the embodiment, the disparity map 212 may be high-resolution or low-resolution. The confidence map 214 corresponds pixel-to-pixel to the disparity map 212. The confidence map 214 indicates how confident the disparity network 210 is about its prediction at each pixel of the disparity map 212. As shown in FIG. 2, the confidence map 214 is computed by the disparity network 210, but the confidence map 214 may not be used in the initial Bokeh image generation of the first step. Instead, the confidence map 214 is utilized in the second step for Bokeh refinement. As discussed in greater detail below, the DoF network 230 uses the confidence map 214 in regions of low confidence. Based on values in the confidence map 214, the DoF network 230 may trust the images 201 and 202 more or less than the disparity map 212 when rendering each pixel of the refined Bokeh image 232.

Figure 3:
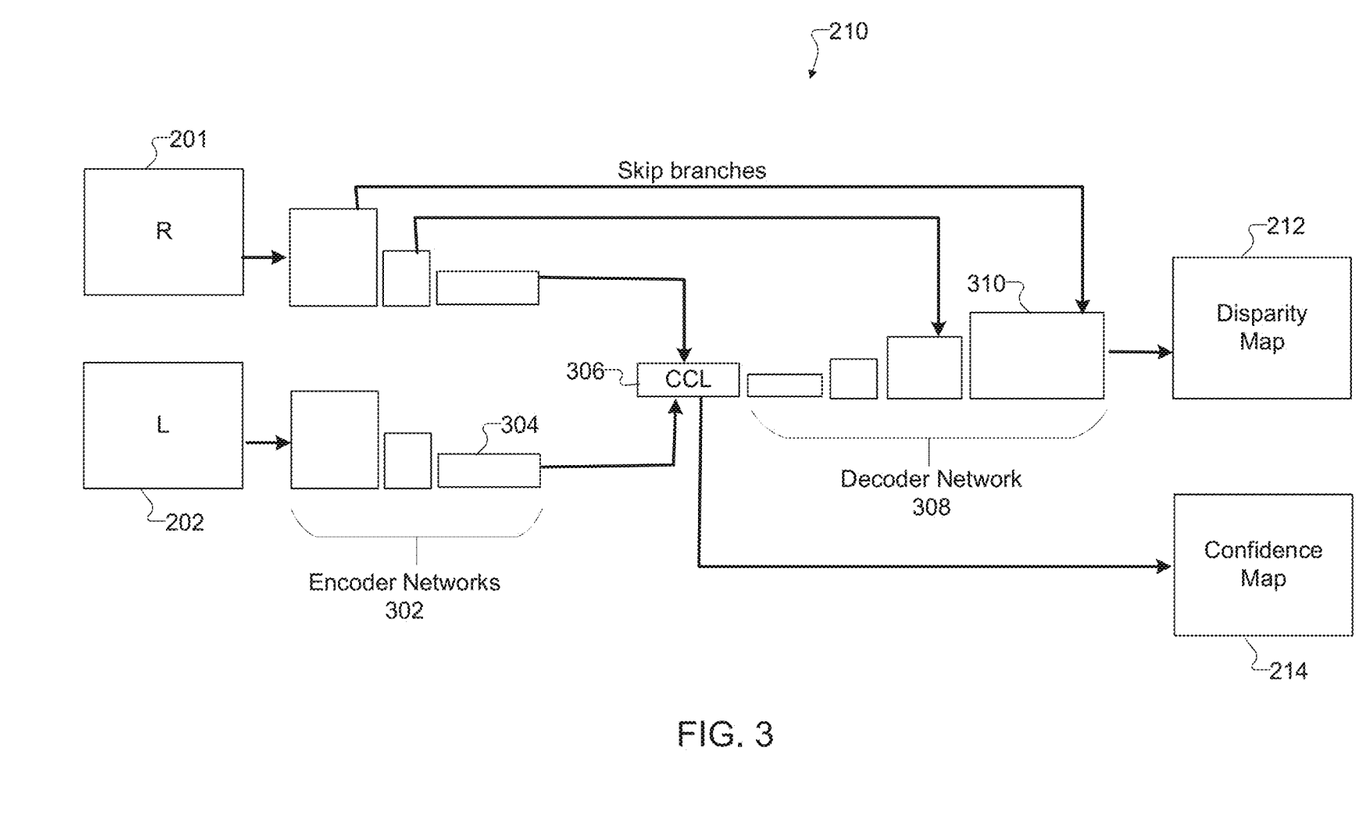
FIG. 3 illustrates an example architecture of a disparity network of FIG. 2 according to this disclosure.

FIG. 3 illustrates an example architecture of the disparity network 210 of FIG. 2 according to this disclosure. As shown in FIG. 3, the disparity network 210 receives the images 201 and 202 and produces the disparity map 212 and the confidence map 214. The disparity network 210 is based on a convolutional neural network (CNN) architecture, which generally represents a type of deep artificial neural network that can be applied to analyze images.

The disparity network 210 includes a pair of shared feature encoder networks 302, one for each of the images 201 and 202. Each feature encoder network 302 includes multiple convolutional layers 304. Each of the convolutional layers 304 represents a layer of convolutional neurons, which operate to apply a convolution operation that emulates the response of individual neurons to visual stimuli. Each neuron typically applies some function to its input values (often by weighting different input values differently) to generate output values. Each feature encoder network 302 here is shown as including three convolutional layers 304, but each feature encoder network 302 could include a different number of convolutional layers. The output of each feature encoder network 302 is a feature map that includes a number of high-level features (such as 64, 128, 256, or other number of features) associated with the corresponding image 201 or 202.

The high-level features from each feature encoder network 302 are passed into a cross-correlation layer 306 and then input into a feature decoder network 308. The feature decoder network 308 is applied to restore the spatial resolution and generate the disparity map 212. The feature decoder network 308 includes multiple deconvolutional or upsampling layers 310. While FIG. 3 shows the feature decoder network 308 with four deconvolutional or upsampling layers 310, the feature decoder network 308 could include a different number of deconvolutional or upsampling layers.

The confidence map 214 is generated from the cross-correlation layer 306 in the disparity network 210. As discussed above, the confidence map 214 represents the confidence of depth prediction of the disparity network 210. The confidence map 214 is provided as an input into the DoF network 230 for Bokeh refinement. With the confidence map 214, the DoF network 230 can be trained to rely less on the disparity map 212 and rely more on the images 201 and 202 in low confidence regions for Bokeh refinement.

Figure 4:
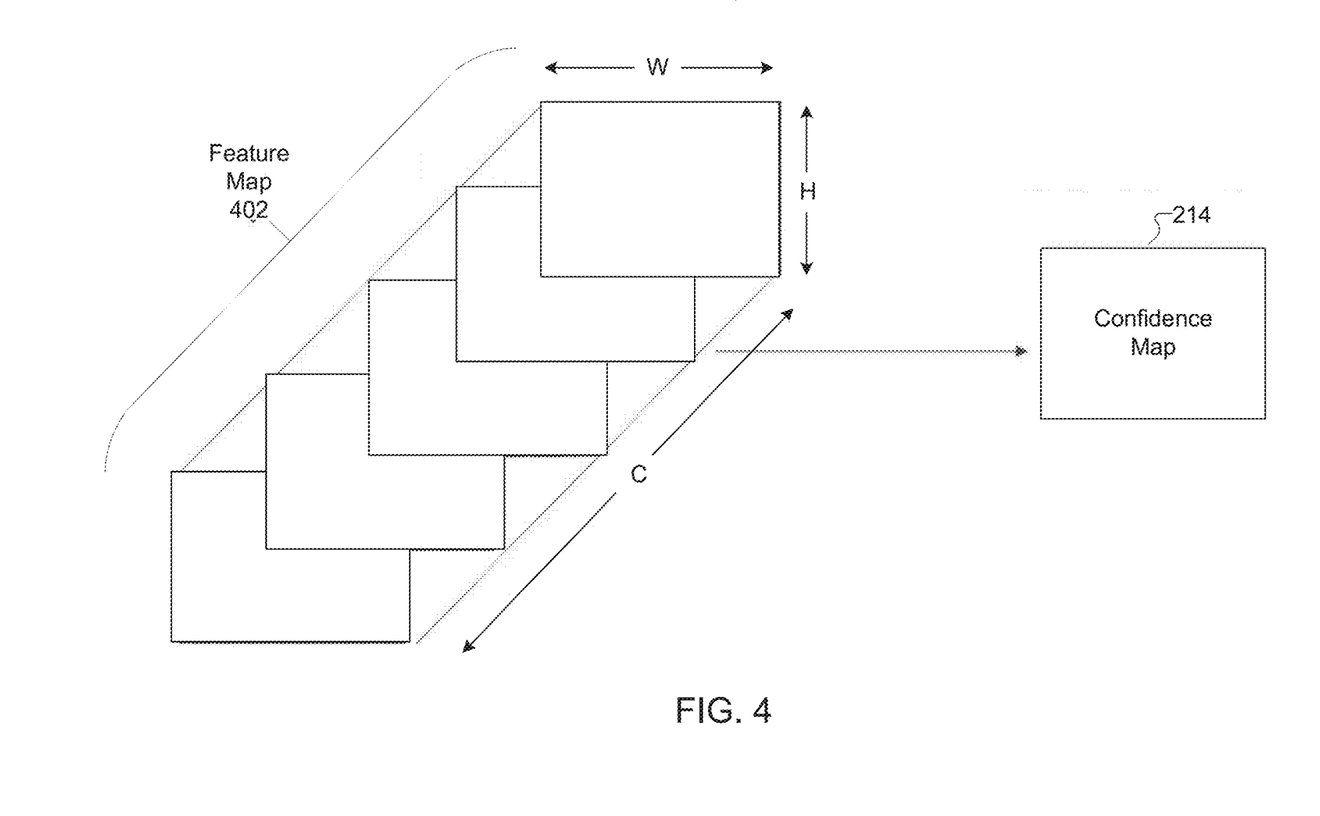
FIG. 4 illustrates additional details of the generation of a confidence map by the disparity network of FIG. 2 according to this disclosure.

FIG. 4 illustrates additional details of the generation of a confidence map 214 by the disparity network 210 of FIG. 2 according to this disclosure. As shown in FIG. 4, the disparity network 210 obtains a feature map 402 that is output from the cross-correlation layer 306. The feature map 402 is a three-dimensional (3D) feature map, such as one with dimensions (H, W, C) where C is the size of the disparity search window. To generate a two-dimensional (2D) confidence map 214, the disparity network 210 applies a softmax operation along the C dimension so that the values included in the feature map 402 are between 0 and 1 and the values along each channel dimension (the C dimension) sum to 1. The softmax operation is a smooth approximation of the "arguments of the maxima" ("argmax") function. Softmax is often used as an activation function of a neural network to normalize the outputs of a network to a probability distribution over predicted output classes. After the softmax operation, the disparity network 210 determines the maximum value for each pixel in (H, W) along the channel dimension, and this value is used as the value for the corresponding pixel in the confidence map 214. Thus, the 2D confidence map 214 represents the confidence of prediction at each pixel of the disparity map 212.

Note that these details for generating the confidence map 214 as shown in FIG. 4 represent one possible technique for generating a confidence map. However, this disclosure is not limited to this specific technique. Other computational techniques can calculate a confidence map and are within the scope of this disclosure. For example, in embodiments that include a time-of-flight (ToF) sensor, infrared amplitude values obtained by the ToF sensor can be used as the confidence map for depth estimation.

Returning to FIG. 2, the electronic device 101 obtains the disparity map 212 generated using the disparity network 210 and provides the disparity map 212 as an input to the DoF renderer 220. Using the disparity map 212, the DoF renderer 220 generates an initial Bokeh image 222 from the images 201 and 202. For example, the DoF renderer 220 may use one or more simulated lens configurations (such as focal length, aperture, and the like) to apply different degrees of blurriness to the initial Bokeh image 222 according to the disparity map 212. As a particular example, the initial Bokeh image 222 may exhibit stronger blur for farther distances. The DoF renderer 220 represents any suitable algorithm or process for applying blur to generate a Bokeh image. In some embodiments, the DoF renderer 220 is a standard mechanic procedure, meaning the DoF renderer 220 does not recover errors in the disparity map 212. Accordingly, the initial Bokeh image 222 may exhibit one or more artifacts or loss of details.

The initial Bokeh image 222 is provided as an input to the DoF network 230. The electronic device 101 applies the DoF network 230 to blend and refine the initial Bokeh image 222 into a refined Bokeh image 232. The DoF network 230 uses the images 201 and 202 (the reference images), the disparity map 212, and the confidence map 214 as additional inputs to blend and refine the initial Bokeh image 222 into the refined Bokeh image 232. In some embodiments, the disparity map 212, the confidence map 214, and the initial Bokeh image 222 can include meta information that is included in or associated with the images 201 and 202 (such as embedded in JPG files or other files of the images). As discussed previously, the first step operations leading to the generation of the initial Bokeh image 222 are performed at image capture time. The DoF network 230 can be applied in a gallery mode or gallery application of the electronic device 101 to generate the refined Bokeh image 232.

Figure 5:
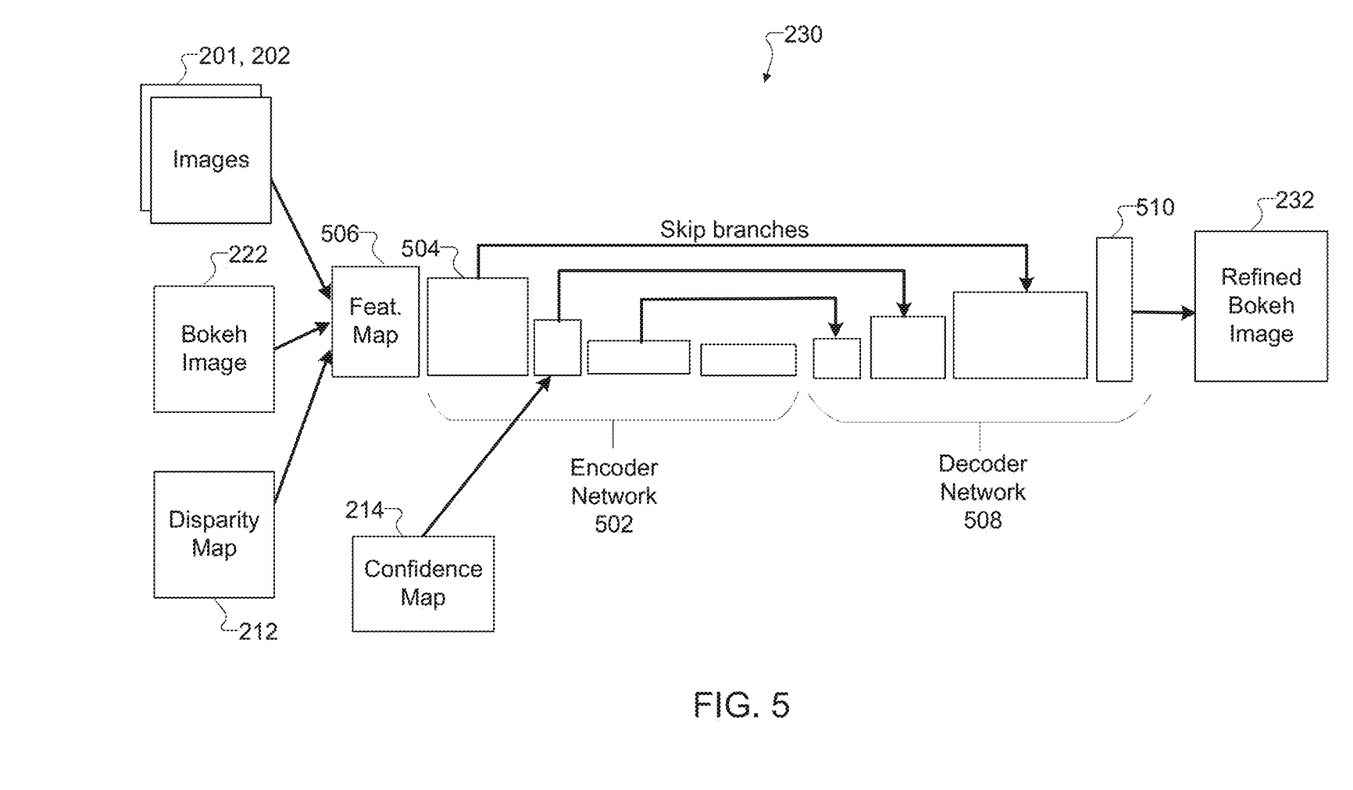
FIG. 5 illustrates an example architecture of a depth-of-field (DoF) network of FIG. 2 according to this disclosure.

FIG. 5 illustrates an example architecture of the DoF network 230 of FIG. 2 according to this disclosure. As shown in FIG. 5, the DoF network 230 is based on a CNN architecture and includes an encoder network 502 and a decoder network 508. The encoder network 502 includes multiple convolutional layers 504. While the encoder network 502 is shown here as including four convolutional layers 504, the encoder network 502 could include a different number of convolutional layers. The decoder network 508 includes multiple deconvolutional or upsampling layers 510. While FIG. 5 shows the decoder network 508 with four deconvolutional or upsampling layers 510, the decoder network 508 could include a different number of deconvolutional or upsampling layers.

The DoF network 230 combines (i) the all-in-focus reference images 201 and 202, (ii) the disparity map 212 that is predicted by the disparity network 210, and (iii) the initial Bokeh image 222 produced by the DoF renderer 220 into a multi-channel feature map 506. In some embodiments, the feature map 506 is a seven-channel feature map, however other numbers of channels are possible and within the scope of this disclosure. The encoder network 502 and the decoder network 508 are applied to the feature map 506. As shown in FIG. 5, the confidence map 214 is concatenated in the middle of the convolutional layers 504 of the encoder network 502. The output of the DoF network 230 is the refined Bokeh image 232.

It should be noted that the operations and functions shown in FIGS. 2 through 5 can be implemented in an electronic device 101, 102, 104, server 106, or other device in any suitable manner. For example, in some embodiments, the operations shown in FIGS. 2 through 5 can be implemented or supported using one or more software applications or other software instructions that are executed by the processor 120 of the electronic device 101, 102, 104, server 106, or other device. In other embodiments, at least some of the operations shown in FIGS. 2 through 5 can be implemented or supported using dedicated hardware components. In general, the operations shown in FIGS. 2 through 5 can be performed using any suitable hardware or any suitable combination of hardware and software/firmware instructions.

Although FIGS. 2 through 5 illustrate example details of a Bokeh network 200, various changes may be made to FIGS. 2 through 5. For example, while shown as performing a specific sequence of operations, various operations shown in FIGS. 2 through 5 could overlap, occur in parallel, occur in a different order, or occur any number of times (including zero times). Also, the specific operations shown in FIGS. 2 through 5 are examples only, and other techniques could be used to perform each of the operations shown in FIGS. 2 through 5.

Figure 6:
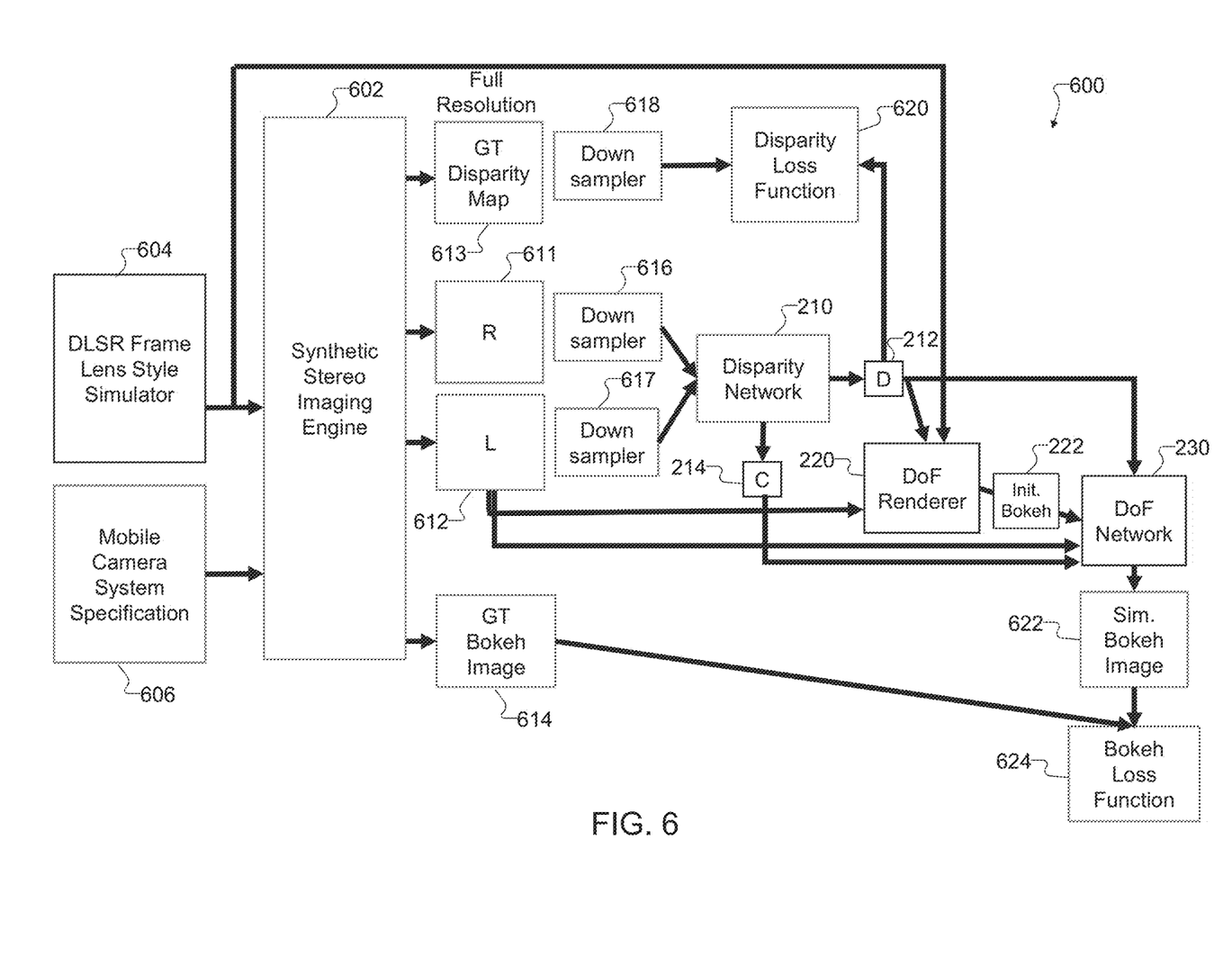
FIG. 6 illustrates an example process for training a Bokeh network according to this disclosure.

FIG. 6 illustrates an example process 600 for training a Bokeh network according to this disclosure. For ease of explanation, the process 600 is described as involving the use of the electronic device 101 of FIG. 1 and some of the components depicted in the Bokeh network 200 of FIGS. 2 through 5. However, the process 600 could be used with any other suitable device (such as the server 106) and any other suitable convolutional neural network architecture. As a particular example, the process 600 could be performed using the server 106, and the trained Bokeh network may then be deployed to the electronic device 101.

During the training process 600, the electronic device 101 trains the Bokeh network 200, which includes training the disparity network 210 and the DoF network 230. The training process 600 is performed in two stages. The first stage involves training the disparity network 210 for disparity map estimation, and the second stage involves training the DoF network 230 for Bokeh refinement.

In order to perform the training process 600, the electronic device 101 obtains training data using a synthetic stereo imaging engine 602. The training process 600 uses the synthetic stereo imaging engine 602 for training data, rather than relying on real photography, because it can be difficult or impossible to obtain a dense pixel-level accurate disparity map ground truth in real photography. The synthetic stereo imaging engine 602 represents any suitable graphical image generation engine, algorithm, or process. In some embodiments, the synthetic stereo imaging engine 602 is a graphics generation engine similar to a gaming engine that is used in computer gaming consoles. Also, in some embodiments, a DSLR frame lens style simulator 604 is executed or otherwise used to provide multiple parameters (such as focal lengths, apertures, effects, and the like) that can be used as an input to the synthetic stereo imaging engine 602 for generating the training data. An additional input to the synthetic stereo imaging engine 602 can include specification information 606 of the mobile camera system.

Given the simulated lens and stereo camera specifications, the synthetic stereo imaging engine 602 operates to generate multiple types of training data, including reference images 611 and 612, a ground truth disparity map 613, and a ground truth DSLR style Bokeh image 614. In some embodiments, the reference images 611 and 612 include a stereo image pair and may correspond to the images 201 and 202 of FIG. 2. The four types of training data 611-614 are used to train the Bokeh network 200.

As discussed above, the training process 600 is performed in two stages. The first stage is to train the disparity network 210 for disparity map estimation. The electronic device 101 takes the stereo reference images 611 and 612 and the ground truth disparity map 613 and downsamples the reference images 611 and 612 and ground truth disparity map 613 using downsampler operations 616-618. For example, the electronic device 101 downsamples the reference image 611 using the downsampler operation 616, downsamples the reference image 612 using the downsampler operation 617, and downsamples the ground truth disparity map 613 using the downsampler operation 618. The downsampler operations 616-618 can include any suitable downsampling or compression algorithms. While shown as three separate operations or algorithms, the downsampler operations 616-618 could include one or more common operations or algorithms. Once the electronic device 101 downsamples the reference images 611 and 612, the downsampled images 611 and 612 are provided as inputs to the disparity network 210.

Using an iterative training process, the electronic device 101 applies the disparity network 210 to the downsampled images 611 and 612 to generate the predicted disparity map 212 and the confidence map 214, which represents the confidence of the disparity network 210 on the predicted disparity map 212. For each iteration of the training process, the electronic device 101 calculates losses using a disparity loss function 620. The disparity loss function 620 determines the end point error (EPE) for that iteration between the ground truth disparity map 613 and the predicted disparity map 212. The disparity loss function 620 helps guide updating of weights for the disparity network 210.

After the first stage of training, the weights of the disparity network 210 are fixed for use during the second stage of training, where the second stage trains the DoF network 230 for Bokeh refinement. Thus, in the second stage, only the weights of the DoF network 230 are learnable. In the second stage, the electronic device 101 applies the DoF renderer 220 to the reference images 611 and 612 to obtain an initial Bokeh image 222. As discussed above, the DoF renderer 220 is a mechanic process, so there are no weights or trainable parameters used in the DoF renderer 220. Using an iterative training process, the electronic device 101 takes multiple inputs, including the initial Bokeh image 222, the reference images 611 and 612, the disparity map 212, and the confidence map 214, and applies the DoF network 230 to the inputs to generate a simulated Bokeh image 622. For each iteration of the training process, the electronic device 101 calculates losses using a Bokeh loss function 624. The Bokeh loss function 624 determines the L2 error or other error between the ground truth Bokeh image 614 and the simulated Bokeh image 622. The Bokeh loss function 624 helps guide updating of weights for the DoF network 230. The objective of training the DoF network 230 is to minimize the Bokeh loss function 624. When the Bokeh network 200 is trained using the disparity loss function 620 and the Bokeh loss function 624, the Bokeh network 200 is able to recover the correct simulated Bokeh image 622 in the DoF network 230, even if the disparity map 212 produced by the disparity network 210 has errors.

Although FIG. 6 illustrates one example of a process 600 for training a Bokeh network, various changes may be made to FIG. 6. For example, the disparity network 210 and the DoF network 230 may be trained in any other suitable manner, which may involve the use of other or additional loss functions.

Figure 7A:
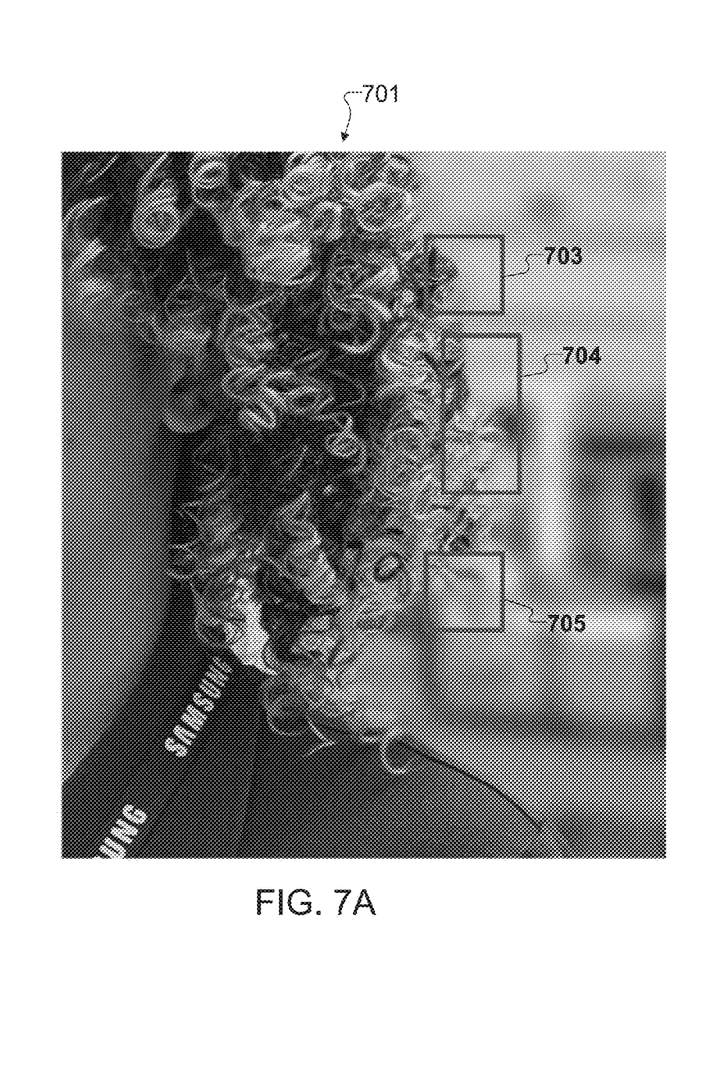
FIGS. 7A and 7B illustrate examples of benefits that can be realized using one or more of the embodiments of this disclosure.
Figure 7B:
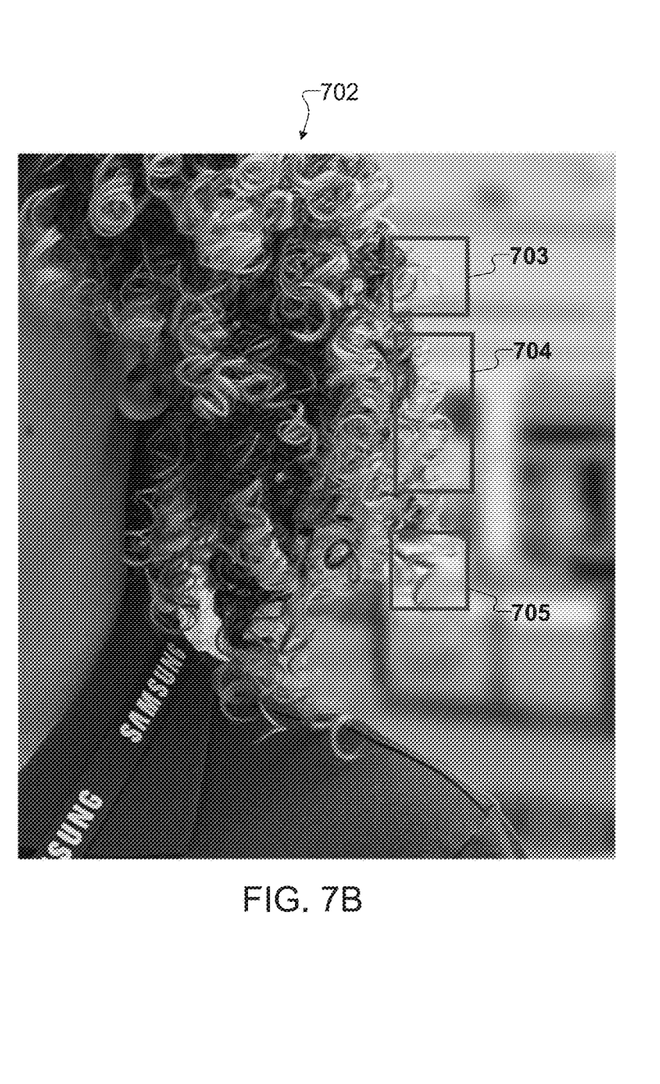

FIGS. 7A and 7B illustrate examples of benefits that can be realized using one or more of the embodiments of this disclosure. More specifically, FIGS. 7A and 7B depict a comparison between a Bokeh image 701 of a scene that is generated using conventional image processing and a refined Bokeh image 702 of the same scene that is generated using one of the embodiments described above.

In FIG. 7A, the Bokeh image 701 was captured and processed using a conventional image operation. No refinement of the Bokeh image 701 was performed. As can be seen in FIG. 7A, the Bokeh image 701 exhibits significant blurring or missing details in regions 703-705. In contrast, the refined Bokeh image 702 in FIG. 7B was captured and processed using the Bokeh refinement operations described above. The resulting refined Bokeh image 702 provides superior results compared to the Bokeh image 701, particularly with respect to the recovered details in the regions 703-705.

Although FIGS. 7A and 7B illustrate examples of benefits that can be realized using one or more of the embodiments of this disclosure, various changes may be made to FIGS. 7A and 7B. For example, images can be captured of numerous scenes under different conditions, and these figures do not limit the scope of this disclosure. These figures are merely meant to illustrate example types of benefits that might be obtainable using the techniques described above.

Figure 8:
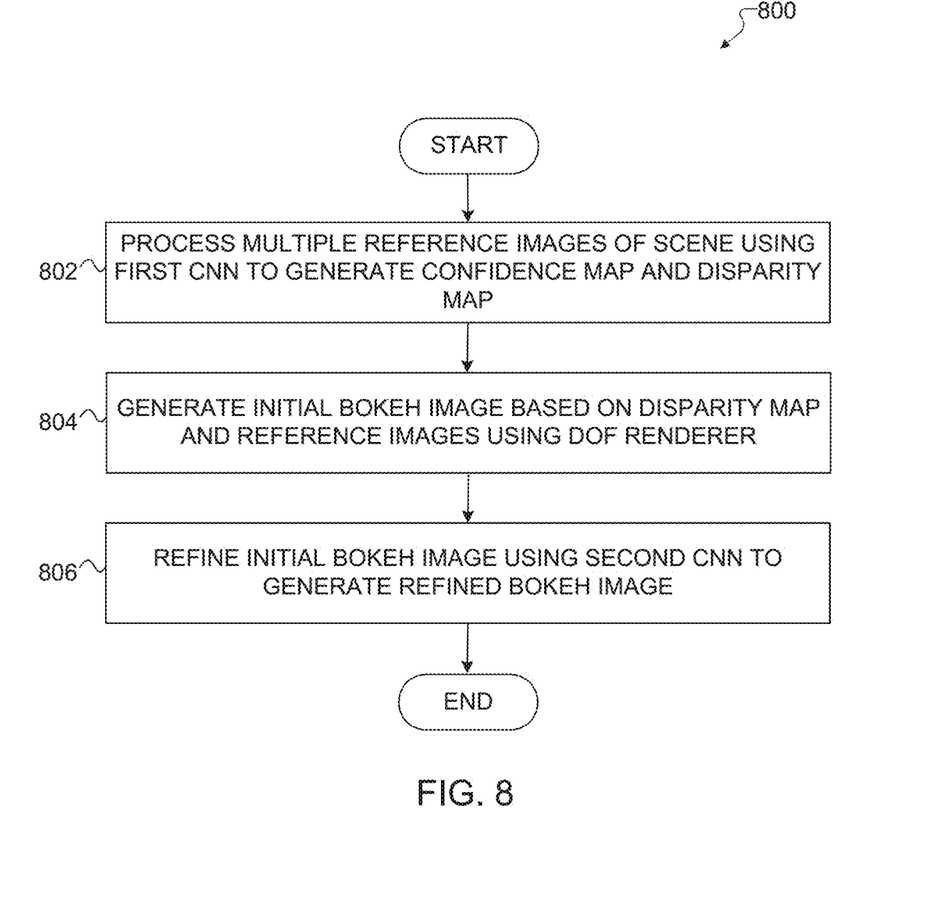
FIG. 8 illustrates an example method for generating and refining a Bokeh image according to this disclosure.

FIG. 8 illustrates an example method 800 for generating and refining a Bokeh image according to this disclosure. For ease of explanation, the method 800 shown in FIG. 8 is described as involving the use of the Bokeh network 200 shown in FIGS. 2 through 5 with the electronic device 101 shown in FIG. 1. However, the method 800 shown in FIG. 8 could be used with any other suitable electronic device and in any suitable system.

As shown in FIG. 8, at step 802, an electronic device processes multiple reference images of a scene using a first CNN to generate a confidence map and a disparity map. This could include, for example, the electronic device 101 processing the images 201 and 202 using the disparity network 210 to generate the disparity map 212 and the confidence map 214. At step 804, the electronic device generates an initial Bokeh image based on the disparity map and the reference images using a DoF renderer. This could include, for example, the electronic device 101 using the DoF renderer 220 to generate the initial Bokeh image 222 based the disparity map 212 and the images 201 and 202. At step 806, the electronic device refines the initial Bokeh image using a second CNN to generate a refined Bokeh image. This could include, for example, the electronic device 101 using the confidence map 214, the disparity map 212, and the images 201 and 202 in the DoF network 230 to generate the refined Bokeh image 232.

Although FIG. 8 illustrates one example of a method 800 for generating and refining a Bokeh image, various changes may be made to FIG. 8. For example, while shown as a series of steps, various steps in FIG. 8 could overlap, occur in parallel, occur in a different order, or occur any number of times.

Figure 9:
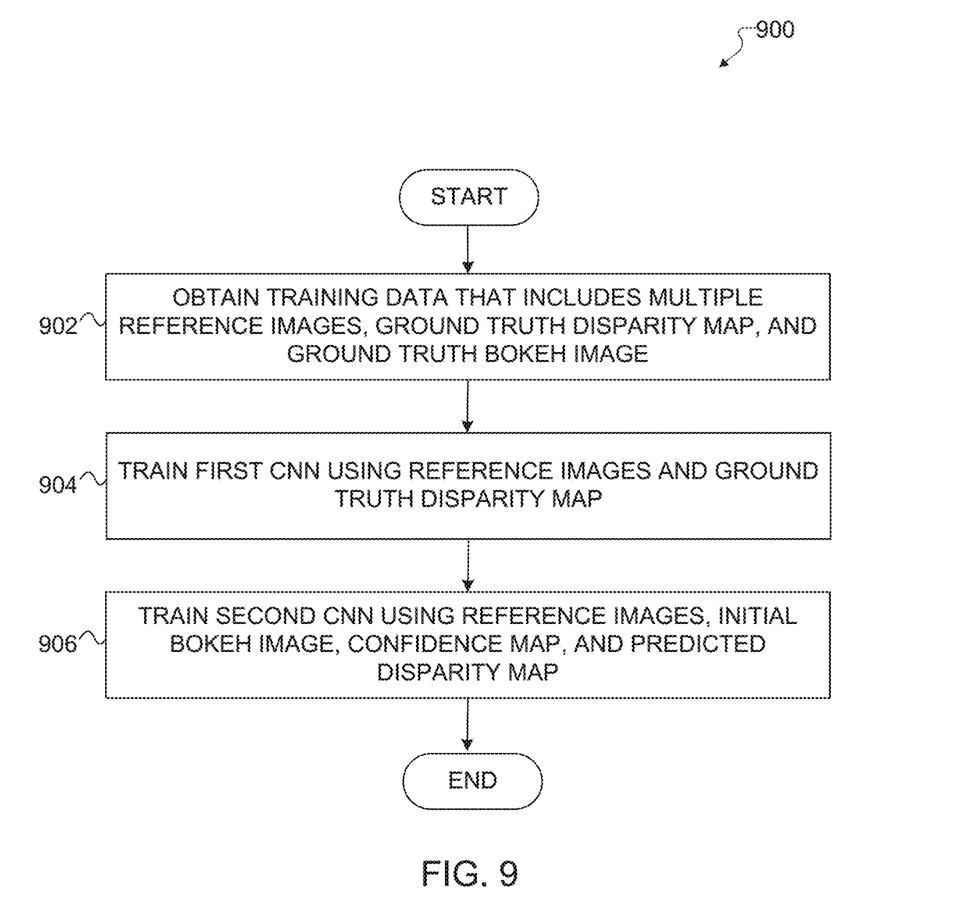
FIG. 9 illustrates an example method for training a Bokeh network according to this disclosure.

FIG. 9 illustrates an example method 900 for training a Bokeh network according to this disclosure. For ease of explanation, the method 900 shown in FIG. 9 is described as involving the use of the training process 600 of FIG. 6 on the Bokeh network 200 of FIGS. 2 through 5 using the electronic device 101 shown in FIG. 1. However, the method 900 shown in FIG. 9 could be used with any other suitable electronic device and in any suitable system.

As shown in FIG. 9, at step 902, an electronic device obtains training data that includes multiple reference images, a ground truth disparity map, and a ground truth Bokeh image. This could include, for example, the electronic device 101 using the synthetic stereo imaging engine 602 to generate the reference images 611 and 612, the ground truth disparity map 613, and the ground truth Bokeh image 614. At step 904, the electronic device trains a first CNN using the reference images and the ground truth disparity map. This could include, for example, the electronic device 101 training the disparity network 210 using the reference images 611 and 612 and the ground truth disparity map 613. At step 906, the electronic device trains a second CNN using the reference images, an initial Bokeh image, a confidence map generated during the training of the first CNN, and a predicted disparity map generated during the training of the first CNN. This could include, for example, the electronic device 101 training the DoF network 230 using the reference images 611 and 612, the initial Bokeh image, the confidence map 214, and the predicted disparity map 212.

Although FIG. 9 illustrates one example of a method 900 for training a Bokeh network, various changes may be made to FIG. 9. For example, while shown as a series of steps, various steps in FIG. 9 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
processing, using at least one processor of an electronic device, multiple reference images of a scene using a first trained convolutional neural network (CNN) to generate a confidence map and a disparity map;
generating, using the at least one processor, an initial Bokeh image based on the disparity map and the reference images using a depth-of-field (DoF) renderer; and
refining, using the at least one processor, the initial Bokeh image using a second trained CNN to generate a refined Bokeh image, wherein the second trained CNN uses the confidence map, the disparity map, and the reference images to generate the refined Bokeh image.

2. The method of claim 1, wherein:
the confidence map has a pixel-to-pixel correspondence with the disparity map; and
the confidence map indicates a confidence level of the first trained CNN at each pixel of the disparity map.

3. The method of claim 1, wherein the second trained CNN uses the confidence map to determine whether to trust the reference images or the disparity map when generating the refined Bokeh image.

4. The method of claim 1, wherein the confidence map is generated from a cross-correlation layer of the first trained CNN.

5. The method of claim 4, wherein the confidence map is generated by applying a softmax operation along one dimension of a three-dimensional feature map output from the cross-correlation layer.

6. The method of claim 1, wherein:
the second trained CNN comprises an encoder network having multiple convolutional layers; and
the confidence map is concatenated in a middle portion of the convolutional layers of the encoder network.

7. The method of claim 1, wherein:
the initial Bokeh image is generated at a capture time of the reference images; and
the refined Bokeh image is generated in a gallery mode or application of the electronic device.

8. The method of claim 1, wherein the reference images comprise first and second images that form a stereo image pair.

9. An electronic device comprising:
at least one memory configured to store multiple reference images of a scene; and
at least one processing device configured to:
process the reference images using a first trained convolutional neural network (CNN) to generate a confidence map and a disparity map;

generate an initial Bokeh image based on the disparity map and the reference images using a depth-of-field (DoF) renderer; and refine the initial Bokeh image using a second trained CNN to generate a refined Bokeh image, wherein the second trained CNN is configured to use the confidence map, the disparity map, and the reference images to generate the refined Bokeh image.

10. The electronic device of claim 9, wherein:

the confidence map has a pixel-to-pixel correspondence with the disparity map; and the confidence map indicates a confidence level of the first trained CNN at each pixel of the disparity map.

11. The electronic device of claim 9, wherein the second trained CNN is configured to use the confidence map to determine whether to trust the reference images or the disparity map when generating the refined Bokeh image.

12. The electronic device of claim 9, wherein the at least one processing device is configured to generate the confidence map from a cross-correlation layer of the first trained CNN.

13. The electronic device of claim 12, wherein, to generate the confidence map, the at least one processing device is configured to apply a softmax operation along one dimension of a three-dimensional feature map output from the cross-correlation layer.

14. The electronic device of claim 9, wherein:

the second trained CNN comprises an encoder network having multiple convolutional layers; and the at least one processing device is configured to concatenate the confidence map in a middle portion of the convolutional layers of the encoder network.

15. The electronic device of claim 9, wherein the at least one processing device is configured to:

generate the initial Bokeh image at a capture time of the reference images; and generate the refined Bokeh image in a gallery mode or application of the electronic device.

16. The electronic device of claim 9, wherein the reference images comprise first and second images that form a stereo image pair.

17. A method comprising:

obtaining, using at least one processor of an electronic device, training data comprising multiple reference images, a ground truth disparity map, and a ground truth Bokeh image;

training, using the at least one processor, a first convolutional neural network (CNN) using the reference images and the ground truth disparity map; and training, using the at least one processor, a second CNN using the reference images, an initial Bokeh image, a confidence map generated during the training of the first CNN, and a predicted disparity map generated during the training of the first CNN.

18. The method of claim 17, wherein weights obtained during the training of the first CNN are fixed during the training of the second CNN.

19. The method of claim 17, wherein training the first CNN comprises using a disparity loss function to determine an error between the ground truth disparity map and the predicted disparity map.

20. The method of claim 17, wherein training the second CNN comprises using a Bokeh loss function to determine an error between the ground truth Bokeh image and a simulated Bokeh image generated during the training of the second CNN.

* * * * *